(12) United States Patent
Kim

(10) Patent No.: US 8,786,816 B2
(45) Date of Patent: Jul. 22, 2014

(54) DISPLAY PANEL AND MANUFACTURING METHOD FOR THE SAME

(75) Inventor: Nam-Jin Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 310 days.

(21) Appl. No.: 12/926,333

(22) Filed: Nov. 10, 2010

(65) Prior Publication Data

US 2011/0234967 A1    Sep. 29, 2011

(30) Foreign Application Priority Data

Mar. 23, 2010    (KR) ......................... 10-2010-0025949

(51) Int. Cl.
*G02F 1/1339*    (2006.01)

(52) U.S. Cl.
USPC .......................................... 349/153; 349/190

(58) Field of Classification Search
USPC .................. 349/149, 151–154, 190
See application file for complete search history.

(56) References Cited

U.S. PATENT DOCUMENTS

| | | | | |
|---|---|---|---|---|
| 2002/0030784 | A1* | 3/2002 | Onaka et al. ................ | 349/153 |
| 2003/0137630 | A1* | 7/2003 | Niiya ........................... | 349/153 |
| 2004/0183986 | A1* | 9/2004 | Onda et al. .................. | 349/153 |
| 2005/0117106 | A1* | 6/2005 | Tatemura et al. ............ | 349/153 |
| 2005/0219454 | A1* | 10/2005 | Lee .............................. | 349/153 |
| 2006/0103802 | A1* | 5/2006 | Miki et al. ................... | 349/153 |
| 2008/0316419 | A1* | 12/2008 | Choi et al. ................... | 349/190 |
| 2009/0015779 | A1* | 1/2009 | Ohashi ......................... | 349/154 |

FOREIGN PATENT DOCUMENTS

| | | | |
|---|---|---|---|
| JP | 60232530 | * | 11/1985 |
| JP | 2009-192756 | A | 8/2009 |
| KR | 10 2005-0119359 | A | 12/2005 |
| KR | 10 2006-0000442 | A | 1/2006 |
| KR | 10 2006-0072785 | A | 6/2006 |
| KR | 10 2006-0087724 | A | 8/2006 |
| KR | 10 2008-0070318 | A | 7/2008 |
| KR | 10 2010-0007630 | A | 1/2010 |

* cited by examiner

*Primary Examiner* — Jessica M Merlin

(74) *Attorney, Agent, or Firm* — Lee & Morse, P.C.

(57) ABSTRACT

A display panel includes a first substrate, a second substrate facing the first substrate, a dam disposed between the first substrate and the second substrate along edges of the first and second substrates, the first substrate, second substrate, and dam having a same outermost incision surface, and a sealing member disposed between the first and second substrates, the sealing member being between an interior of the display panel and the dam.

19 Claims, 7 Drawing Sheets

DISPLAY PANEL AND MANUFACTURING METHOD FOR THE SAME

BACKGROUND

1. Field

The described technology relates generally to a display panel and a manufacturing method thereof. More particularly, the described technology relates generally to a display panel including a dam, and a manufacturing method thereof.

2. Description of the Related Art

A flat panel display, e.g., a liquid crystal display (LCD) or an organic light emitting diode (OLED) display, may exhibit several advantages, e.g., a small size, a reduced thickness, and a low power consumption. Therefore, a flat panel display may be mounted in and used for a small-sized product, e.g., a mobile phone, a personal digital assistant (PDA), and a portable multimedia player (PMP), as well as medium-sized and large-sized products, e.g., monitors and TVs.

For example, a conventional LCD may be formed of a LCD panel displaying image data using an optical characteristic of liquid crystal, a flexible printed circuit (FPC) where a driving circuit is formed for driving the LCD panel, a backlight assembly including a light source for screen displaying, and a mold frame for receiving the backlight assembly. The LCD panel may include a thin film transistor (TFT) substrate, a color filter (CF) substrate, and liquid crystal disposed therebetween. For example, after forming a mother panel by sealing the TFT substrate and the CF substrate, the mother panel may be cut into a plurality of cells, so each cell may correspond to a LCD panel.

The above information disclosed in this Background section is only for enhancement of understanding of the background of the described technology and therefore it may contain information that does not form the prior art that is already known in this country to a person of ordinary skill in the art.

SUMMARY

Embodiments are therefore directed to a display panel with a dam and a manufacturing method thereof, which substantially overcome one or more of the problems due to the limitations and disadvantages of the related art.

It is therefore a feature of an embodiment to provide a display panel with a dam capable of preventing defects when a mother panel is cut, thereby improving yield and productivity.

It is therefore another feature of an embodiment to provide a display panel with a dam capable of maintaining sufficient adhesion between substrates of the display panel when a mother panel is cut.

It is yet another feature of an embodiment to provide a method for manufacturing a display panel having one or more of the above features.

At least one of the above and other features and advantages may be realized by providing a display panel, including a first substrate, a second substrate facing the first substrate, a dam disposed between the first substrate and the second substrate along edges of the first and second substrates, the first substrate, second substrate, and dam having a same outermost incision surface, and a sealing member disposed between the first and second substrates, the sealing member being between an interior of the display panel and the dam.

The display panel may further include a pixel electrode on the first substrate, and a common electrode on the second substrate. The common electrode may include indium tin oxide (ITO) or indium zinc oxide (IZO). The common electrode may be between the dam and the interior of the display panel.

The display panel may further include a driving circuit along a first side of the first substrate, the dam extending along three sides of the first substrate other than the first side of the first substrate.

The dam may include a non-conductive material.

The dam may further include a column spacer configured to maintain a gap between the first and second substrates. The display panel may further include a color filter and an overcoat on the second substrate, the dam including a substantially same material as the overcoat.

The sealing member may include a spacer. The spacer may include a non-conductive material. The spacer may include a conductive material. The spacer may be electrically connected with a common electrode on the second substrate.

At least one of the above and other features and advantages may also be realized by providing a liquid crystal display panel, including a first substrate, a second substrate facing the first substrate, a liquid crystal layer disposed between the first substrate and the second substrate, a dam disposed between the first substrate and the second substrate along edges of the first and second substrates, the dam including an insulating material and being spaced apart from the liquid crystal layer, and a sealing member disposed between the first and second substrates, the sealing member being between the liquid crystal layer and the dam.

The dam, the first substrate, and the second substrate may have a same outmost incision surface.

The liquid crystal display panel may further include at least one conductive member having an end portion positioned on the first substrate or the second substrate.

A terminal edge of the end portion may be coplanar with a lateral surface of the sealing member, the terminal edge of the end portion contacting the dam to be electrically blocked from the outside.

At least one of the above and other features and advantages may also be realized by a manufacturing method of a liquid crystal display panel, including defining a plurality of cells on first and second substrates, forming a thin film transistor in each cell on the first substrate, forming a color filter and a common electrode in each of the plurality of cells on the second substrate, forming a dam along boundaries of the defined cells on the second substrate, forming a sealing member on the second substrate adjacent to the dam, each sealing member being between an interior of a respective cell and the dam, forming a liquid crystal layer in the interior of each cell, sealing the first substrate and the second substrate, and cutting out each cell through the dam.

A driving circuit area may be formed along a first side in each cell of the plurality of cells on the second substrate, such that the dam is formed along three sides, other than the first side, of each cell.

The height of the sealant may be higher than that of the dam.

The dam may be made of a non-conductive material.

The sealant may include a spacer, and in this case the spacer may be made of a non-conductive material.

The spacer may be made of a conductive material or formed by coating a metal on a non-conductive material, and the spacer may be arranged to be electrically connected with the common electrode.

A cutting wheel-scriber or a laser may be used to cut out the upper portion of the dam.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
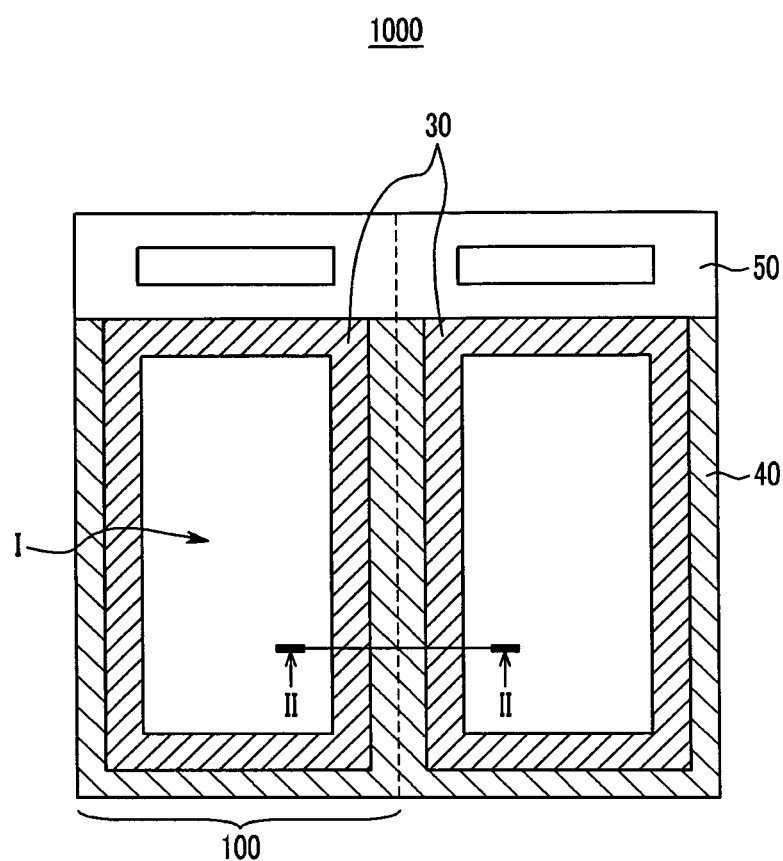
FIG. 1 illustrates a schematic view of a mother panel of a display panel according to an exemplary embodiment.

Korean Patent Application No. 10-2010-0025949, filed on Mar. 23, 2010, in the Korean Intellectual Property Office, and entitled: "Display Panel and Manufacturing Method for the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2A:
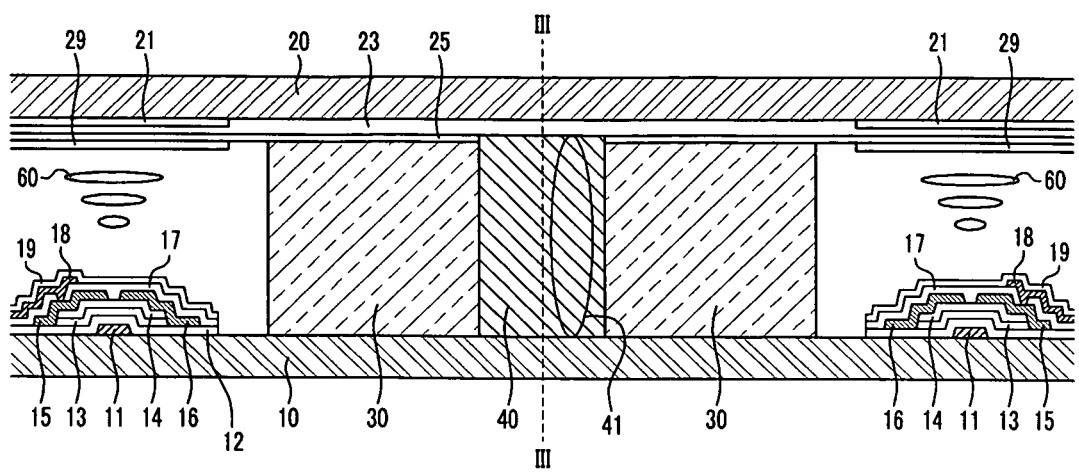
FIG. 2A illustrates a cross-sectional view of the mother panel in FIG. 1 along line II-II.
Figure 2B:
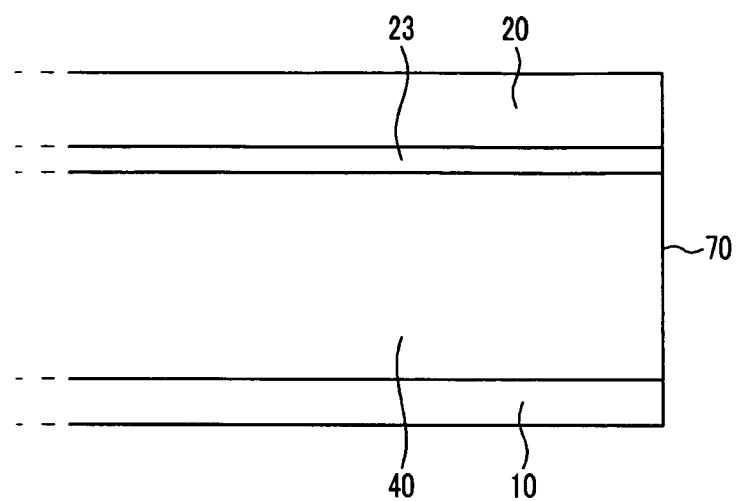
FIG. 2B illustrates a cross-sectional view along line III-III of FIG. 2A.

FIG. 1 schematically illustrates a top plan view of a mother panel 1000 of a display panel according to an exemplary embodiment, FIG. 2A illustrates a cross-sectional view of the mother panel of FIG. 1 along line II-II, and FIG. 2B illustrates a cross-sectional view along line III-III of FIG. 2A. A structure of a LCD panel 100 according to an exemplary embodiment will now be described with reference to FIGS. 1-2A. It is noted that although FIGS. 1-2A refer to a LCD panel, example embodiments may be applied to other display panels, e.g., a display panel of an OLED device. It is further noted that although example embodiments describe the mother panel 1000 for forming two LCD panels 100, any number of display panels may be formed according to exemplary embodiments, i.e., the size of the display panel, the size of the mother panel, and the number of display panels included in one mother panel may be variously modified according to the purpose of use of the display device.

Referring to FIGS. 1-2A, the LCD panel 100 according to the present exemplary embodiment may include a first substrate 10, a second substrate 20 facing the first substrate 10, a sealing member 30 interposed between the first and second substrates 10 and 20, and liquid crystal 60 provided between the first and second substrates 10 and 20. The LCD panel 100 may be divided into an active area and a black matrix, so the active area may correspond to a screen display portion and the black matrix may be a non-display area that corresponds to an area where wires for driving the LCD panel are installed. As illustrated in FIG. 1, the LCD panel 100 of the present exemplary embodiment may further include a driving circuit area 50. The driving circuit area 50 implies a connection with an external integrated circuit for driving of the LCD panel 100 or a portion for installing the integrated circuit. However, the exemplary embodiments are not limited thereto.

In detail, the substrate 10 may be formed as a TFT substrate and the second substrate 20 may be formed as a CF substrate. However, locations of TFTs and CFs within the LCD panel 100 are not limited thereto.

As illustrated in FIG. 2A, a TFT may be formed on the first substrate 10. In detail, a gate electrode 11, a gate insulating layer 12, a semiconductor layer 13, and an ohmic contact layer 14 may be sequentially formed on the first substrate 10. In addition, a drain electrode 15 and a source electrode 16 may be formed on the ohmic contact layer 14 and the gate insulating layer 13, and a protective layer 17 may be formed on the drain electrode 15 and the source electrode 16. A pixel electrode 18 may be formed on the protective layer 17 and may contact the drain electrode 15, and a first alignment layer 19 may be formed on the pixel electrode 18 to complete the TFT. The TFT may be formed in the active area of the LCD panel 100, e.g., the active area may correspond to an internal area I surrounded by the sealing member 30 in FIG. 1. Such a configuration of the TFT is exemplary, and embodiments are not limited thereto. It is noted that the internal area I may be also referred to as an interior of the LCD panel 100.

As further illustrated in FIG. 2A, a color filter 21, an overcoat 23, a common electrode 25, and a second alignment layer 29 may be sequentially formed in the active area on the second substrate 20. The common electrode 25 may be formed of a transparent electrode material, e.g., indium tin oxide (ITO) or indium zinc oxide (IZO). Such a configuration of the color filter and common electrode is exemplary, and the embodiments are not limited thereto.

As illustrated in FIG. 2A, the first substrate 10 and the second substrate 20 may be sealed by the sealing member 30. The sealing member 30 may be formed on the black matrix, e.g., separated from the active area to thereby surround the active area. The sealing member 30 may be distanced from the active area to prevent insertion of a sealant into the active area during a process for coating and sealing.

As illustrated in FIGS. 1-2A, the LCD panel 100 according to the present exemplary embodiment may further include a dam 40. Referring to FIG. 1, the dam 40 may be formed along an edge of the LCD panel 100. That is, the dam 40 may be formed outside of the sealing member 30, so the sealing member 30 may be between the internal area I and the dam 40. In detail, the dam 40 may extend, e.g., continuously, along three outermost edges of the LCD panel 100, e.g., along three sides of the LCD panel 100 excluding a side where the driving circuit area 50 is formed. In other words, the dam 40 may extend along outermost edges of the mother panel 1000 and between adjacent internal areas I, e.g., the dam 40 may have a shape of "Ш" from a plan view before the mother panel 1000 is cut. For example, the dam 40 may extend along three outermost sides of the sealing member 30 in each LCD panel 100, so a perimeter of each sealing member 30 may be enclosed between the driving circuit area 50 and the dam 40.

In general, a dam may be formed inside an internal area, i.e., a sealing member may surround the dam, in order to prevent flow of a sealant into the active area, i.e., into the internal area, during formation of the sealing member. However, the dam 40 in the present exemplary embodiment may be formed outside the sealing member 30. In further detail, the dam 40 may be formed at edges of the first and second substrates 10 and 20 to facilitate cutting boundaries of cells, i.e., individual LCD panels. That is, the dam 40 may be formed along boundaries between neighboring cells in the mother panel 1000 to facilitate cutting the mother panel 1000 along the boundaries. As such, when the mother panel 1000 is cut through portions of the dam 40 into individual cells, each cell, i.e., individual LCD panel 100, may have the first substrate 10, the second substrate 20, and the dam 40 with a same outermost incision surface 70 (FIG. 2B). In other words, cutting the mother panel 1000 along the dashed line (FIG. 1) may define substantially coplanar outer surfaces of the first substrate 10, second substrate 20, and dam 40 along the incision surface 70, i.e., a surface defined by cutting along the dashed line. It is noted that in the present specification, an "edge" of a substrate is used interchangeably with a "boundary" of a cell cut out of the mother panel, i.e., an "edge" or a "boundary" of an individual LCD panel cut out of the mother panel.

As described above, the dam 40 of the present exemplary embodiment may be formed along three sides, excluding one side where the driving circuit area 50 is formed. The dam 40 may be formed integrally along the boundaries of the cells, e.g., continuously along the boundaries, rather than being located in the middle of the boundaries of the neighboring cells. In the present exemplary embodiment, the dam 40 may be formed with a column spacer 41 that maintains a gap between the first and second substrates 10 and 20, and may be provided at both sides with reference to the boundary of the cells. In this case, the dam 40 may be made of an insulating organic and/or inorganic material. However, the shape and composition of the dam 40 is not limited to the above and may be variously modified, e.g., the dam may be made of the same material as and integrally with the overcoat 23.

As described above, the dam 40 made of an insulating material according to example embodiments may be formed at the boundary of neighboring cells on the mother panel 1000, and the dam 40 may be cut, e.g., via an upper portion thereof, without performing a striking process using a separate breaker. Accordingly, a defect ratio of the LCD panel may be reduced. In addition, the dam 40 may function as a buffer if a striking process with a breaker is performed. In contrast, when a conventional mother panel, i.e., a mother panel without the dam 40, is cut through a sealing member at cell boundaries, e.g., via the striking process by applying pressure to a groove at an upper portion of the sealing member with a breaker, defects may occur during the cutting process due to insufficient coating of a sealant along the cell boundaries.

Further, referring back to FIG. 2, the common electrode 25 may pass through an upper portion of the sealing member 30, e.g., the common electrode may be directly on an upper surface of the sealing member 30. The dam 40 according to example embodiments may secure, e.g., overlap, a terminal edge of the common electrode 25, so the common electrode 25 may not protrude outside, e.g., may not be expose to an exterior of, the LCD panel 100. That is, a portion of the dam 40 may be between the common electrode 25 and an exterior of the LCD panel 100 after the mother panel 1000 is cut, so the common electrode 25 may not be exposed to the exterior of the LCD panel 100 after the mother panel 1000 is cut. Accordingly, occurrence of a short-circuit between the common electrode 25 and a mold frame, e.g., metal frame such as stainless steel, of a backlight assembly of the LCD panel 100 may be suppressed. In this respect, it is noted that although the common electrode 25 is described, any conductive wire within the LCD panel 100 may have a shape that is surrounded by the dam 40, so that an electrical short-circuit with an external conductive body, e.g., the mold frame, may be blocked.

In contrast, a common electrode in a conventional LCD panel may extend on a sealing member, so a terminal edge of the common electrode may protrude to the outside, e.g., may be exposed to an exterior, of the LCD panel after cutting the conventional mother panel through the sealing member. As such, when the LCD panel is placed in and contacts a mold frame, e.g., a metal frame for protection, of a backlight assembly, a short-circuit may occur between the common electrode and the mold frame.

In addition, a width of the sealing member 30 of each cell may be maintained to be substantially uniform via the dam 40, as will be described in more detail below with reference to FIGS. 4A-5B, thereby preventing weakening of adhesion between the substrates. In contrast, a width of the sealing member in a conventional mother panel at each of the neighboring cells may be different than that of the sealing member at the other side, so a cell having a smaller width may have reduced adhesion between the TFT substrate and the CF substrate after cutting of the conventional mother panel.

Figure 3:
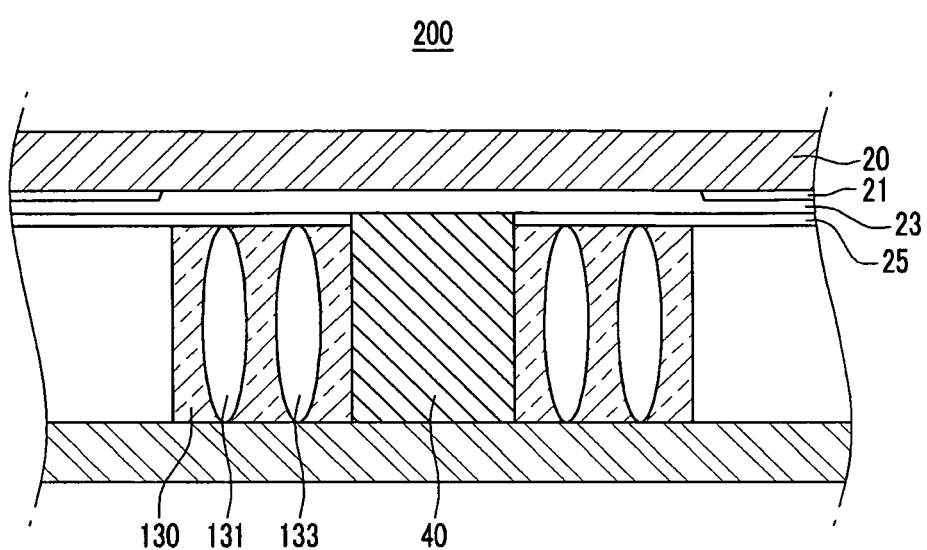
FIG. 3 illustrates a cross-sectional view of a mother panel of a display panel according to another exemplary embodiment.

According to another example embodiment illustrated in FIG. 3, a LCD panel 200 may be substantially the same as the LCD panel 100 described previously with reference to FIGS. 1-2B, with the exception of having a sealing member 130. In particular, the LCD 200 may include the first substrate 10 with the TFT, the color filter 21, the second substrate 20 including the common electrode 25, and the dam 40 formed along the boundaries of cells. In addition, the LCD panel 200 may include the sealing member 130 with spacers 131 and 133.

That is, the sealing member 130 may include a sealant mixed with the spacers 131 and 133. Therefore, when the sealing member 130 is formed and coated, the spacers 131 and 133 may be included in the sealing member 130 after they are hardened. For example, the spacers 131 and 133 may be a seal spacer 131 and a short spacer 133.

The seal spacer 131 may be made of a non-conductive material and may maintain a gap between the first and second substrates 10 and 20, so a space for receiving liquid crystal may be guaranteed between the first and second substrates 10 and 20. The short circuit spacer 133 may include a conductive material, e.g., may include gold coated on a non-conductive material, to apply a voltage to and be electrically connected with the common electrode 25. Further, the short circuit spacer 133 may be connected with other conductive lines of the LCD panel 200.

By forming the sealing member 130 to include the seal spacer 131 and the short circuit spacer 133 therein, separate additional spacers for maintaining a gap between the two substrates 10 and 20 and applying voltage to the common electrode 25 are not required. Accordingly, a space for forming the sealing member 130 and the dam 40 may be sufficiently guaranteed when applying a slim black matrix (BM), i.e., where wires are formed, with a narrow width. That is, in addition to preventing defects when cutting a mother panel through the dam 40 according to example embodiments, the LCD panel 200 may also guarantee sufficient adhesion between the first and second substrates 10 and 20 by sufficiently forming the sealing member 130. In contrast, in a conventional LCD panel having a slim BM, a width of the conventional sealing member formed on the BM is decreased, and accordingly, defects from the cutting method and the weakening of the adhesion may increase.

As shown in FIG. 3, the short circuit spacer 133 may be located relatively closer to the edge of the LCD panel 200 than the seal spacer 131 for electrical connection with the common electrode 25 or the conductive line. Thus, the dam 40 may prevent protrusion, e.g., exposure, of the short spacer 133 with the common electrode 25 to the outside of the LCD panel 200, as described above with reference to the LCD panel 100 and the common electrode 25. In particular, as described above, the dam 40 may prevent exposure of the common electrode 25 and the short spacer 133 to the outside of the LCD panel 200, thereby preventing a short circuit between the mold frame of the backlight assembly and the common electrode 25 and/or the short spacer 133.

As described above, the LCD 200 panel with the dam 40 according to example embodiments may have an improved structure, as a cell cutting defect may be suppressed when cutting the mother panel. Further, a short-circuit between the common electrode 25 and the short spacer 133 may be prevented, the space for the sealing member 130 may be guaranteed, the width of the sealing member 130 may be constantly maintained, and strong adhesion between the substrates may be guaranteed by the dam 40 included in the LCD panel 200.

Figure 4A:
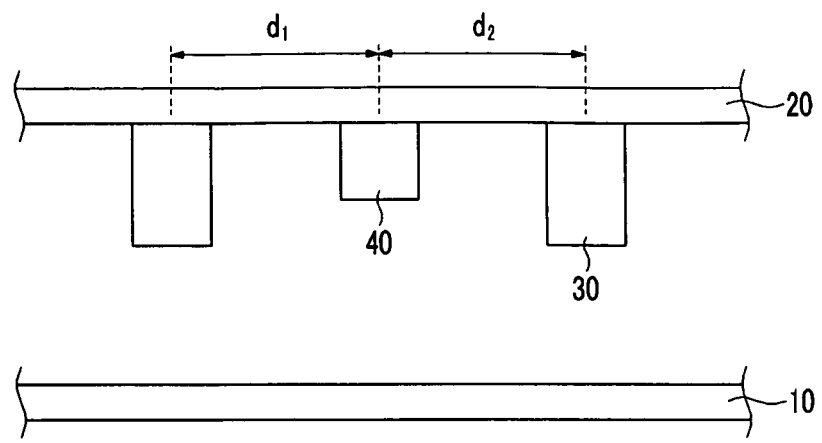
FIG. 4A to FIG. 4C illustrate schematic views of stages in a manufacturing process of a display panel according to an exemplary embodiment.
Figure 4B:
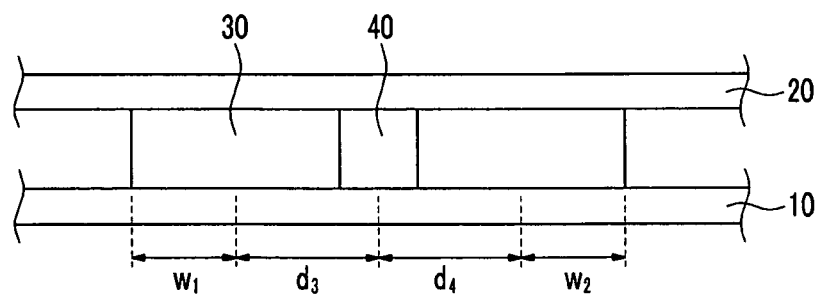
Figure 4C:
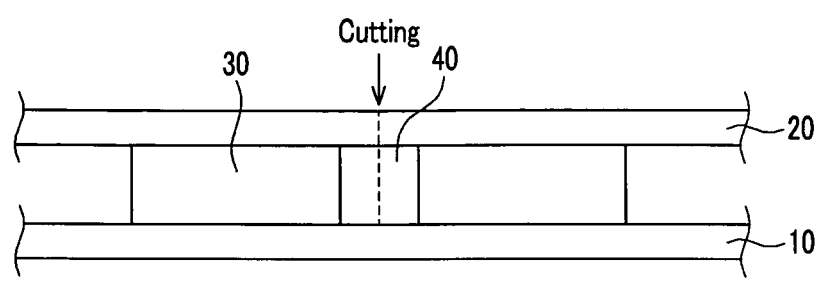

FIG. 4A to FIG. 4C schematically illustrate stages in a manufacturing process of a LCD panel according to an exemplary embodiment. First, a TFT may be formed by sequentially forming a gate electrode, a gate insulating layer, a semiconductor layer, an ohmic contact layer, a drain electrode, a source electrode, a protective layer, and a pixel electrode on an active area of the first substrate 10. A first alignment layer may be formed on the pixel electrode. Next, a color filter, an overcoat, and a common electrode may be sequentially formed on an active area of a second substrate 20, and a second alignment layer may be formed on the common electrode. In this case, the common electrode may be formed of a transparent electrode material, e.g., ITO or IZO.

Referring to FIG. 4A, the dam 40 may be formed at the boundary of neighboring cells on the second substrate 20. The dam 40 may be formed by coating an insulating organic or inorganic material along the boundaries of cells. After forming the dam 40, a sealant may be coated to form the sealing members 30 in cells at both sides of the dam 40. In this case, the sealant may be spaced apart from the active area located inside the second substrate 20. In addition, a distance d1, i.e. a distance from a center of the dam 40 to a center of the sealing member 30 at the left side of the dam 40, and a distance d2, i.e., a distance from the center of the dam 40 to a center of the sealing member 30 at the right side of the dam 40 in FIG. 4A, may be set to be the same. A height of the sealing members 30 may be set to be higher than that of the dam 40. In addition, an amount of sealant coated at each side may equal each other. The sealing member 30 may be formed of an adhesive material, so the first substrate 10 and the second substrate 20 may adhere to each other. For example, the sealing member 30 may include at least one of a seal spacer and a short spacer as previously described with reference to FIG. 3. In this case, the seal spacer may be made of a non-conductive material and the short spacer may be made of a conductive material or a conductive ball formed by coating a conductive metal like gold to a non-conductive material. Liquid crystal may be dripped to an active area at an inner side from the boundary of the sealing member 30 on the second substrate 20.

Referring to FIG. 4B, the first and second substrates 10 and 20 may be attached, i.e., sealed, to each other by the sealant, i.e., sealing member 30, to form a mother panel of the LCD panel. Due to the fluidity of the sealing members 30, the sealing members 30 may flow to the sides during the sealing process, e.g., when pressure is applied between the first and second substrates 10 and 20. Accordingly, the sealing members 30 may flow toward the dam 40, e.g., to contact the dam 40. For example, a portion of the dam 40 between adjacent internal areas may directly contact two adjacent sealing members 30 corresponding to two respective LCD panels. The height of the sealing members 30 may be reduced to be equal to the height of the dam 40. Meanwhile, since the same amount of sealant is coated at both sides of the dam 40, distances d3 and d4 from the center of the dam 40 to the centers of the left and right sealing members 30, respectively, may equal each other. Further, a half-width w1 of the left sealing member 30 and a half-width w2 of the right sealing member 30 may equal each other.

Referring to FIG. 4C, the mother panel of the LCD panel may be formed by sealing the first substrate 10 and the second substrate 20. Next, the upper portion of the dam 40 may be cut out, i.e., the mother panel may be cut through the dam 40 along the dashed line in FIG. 4C. The cutting process may be performed along the upper center of the dam 40 using a cutting wheel scriber or a laser. Unlike the sealing member 30, the dam 40 may be easily cut using the cutting wheel scriber or the laser, and accordingly, an additional striking process using a breaker is not needed. Through such a process, the cutting of the mother panel may be easily performed, and the width of the sealing member 30 can be uniformly formed.

It is noted that a location deviation of the sealing member 30 may occur during a sealant coating process. That is, the sealant may not be symmetrically coated at both sides with reference to the dam 40. However, as will described in reference to FIG. 5A and FIG. 5B, the width of the sealing members 30 in adjacent cells according to example embodiments may be uniformly maintained, thereby providing sufficient adhesion.

Figure 5A:
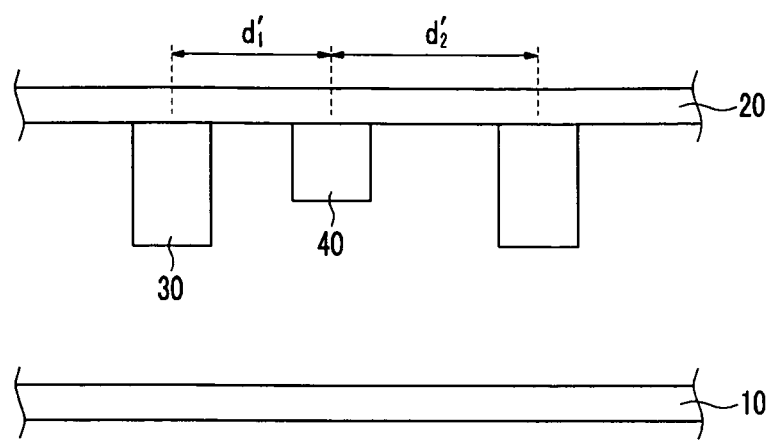
FIG. 5A and FIG. 5B illustrate schematic views of stages in a manufacturing process of a display panel where a location deviation of a sealant occurs.
Figure 5B:
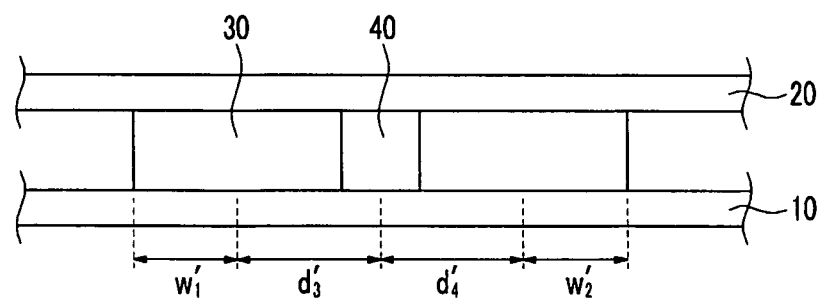

FIG. 5A and FIG. 5B illustrate cross-sectional views of stages in a manufacturing process of a LCD panel, when a location deviation of the sealing member 30 occurs. It is noted that a configuration of the structures in FIGS. 5A and 5B are substantially the same as those in FIGS. 1-4C, with the exception of a location of one of the sealing members 30.

Referring to FIG. 5A, when coating a sealant to the left and right sides with reference to a dam 40 to form the sealing members 30, the coating location may be asymmetrical. That is, a distance d1', i.e., a distance from the center of the dam 40 to a center of the left sealing member 30, may be smaller than a distance d2', i.e., a distance from the center of the dam 40 to a center of the right sealing member 30. However, the height of the sealing members 30 may be higher than that of the dam 40, and the amount of sealant coated at both sides of the dam 40 may equal each other despite the deviation in location.

Referring to FIG. 5B, after liquid crystal is dripped to an active area at inner side from the boundary of the sealant on the second substrate 20, and a mother panel of the LCD panel is formed by sealing the first and second substrates 10 and 20 using the sealing members 30, the sealant in the sealing members 30 may flow to the sides due to pressure applied between the two substrates, as discussed previously with reference to FIG. 4B. When the amounts of sealant are the same but located at different distances from the dam 40, however, the sealant located closer to the dam 40 may flow toward the boundary of the cell to be blocked by the dam 40. As such, the sealant located closer to the dam 40 may flow in the opposite direction due to the pressure. Accordingly, since the same amount of sealant, e.g., adhesive, is coated with reference to the dam 40, the sealant material spreads to cover a same area due to the same applied pressure. Therefore, distances d3' and d4' from the center of the dam 40 to the left and right sealing members 30, respectively, may equal each other. Further, a half width w1' of the left sealing member 30 and a half width w2' of the right sealing member 30 may equal each other. That is, the width of the sealing members 30 at both cells that neighbor each other may be uniformly maintained, as in the case when the sealing members 30 are symmetrical to each other, i.e., when location deviation does not occur. Accordingly, sufficient adhesion may be guaranteed.

Through this, the sealant coating locations may be variously modified through by forming the sealing members 30 after forming the dam 40. That is, the sealants may be coated to both sides of the dam 40 with a constant gap or a different gap. In addition, the sealant may contact the dam 40 and coated to both sides rather than being separated therefrom.

As described, a mother panel according to example embodiments may include a dam at the boundary of neighboring cells, i.e., individual display panels, and sealing members at both sides of the dam. Therefore, the sealing member of each individual display panel, e.g., a LCD panel, may be uniformly maintained and sufficient adhesion between the substrates may be guaranteed. In addition, the mother panel may be cut out through the upper cutting of the dam made of an insulating organic or inorganic material, so that the cutting process may be simplified and defects of the LCD panel may be suppressed to improve a product yield. Further, a short-circuit between the common electrode, the short spacer, and the conductive frame of the backlight assembly of the LCD panel may be suppressed.

| <Description of symbols> | |
|---|---|
| 100, 200: LCD panel | |
| 10: first substrate | 20: second substrate |
| 21: color filter | 23: overcoat |
| 25: common electrode | 30, 130: sealing member |
| 131: seal spacer | 133: short spacer |
| 40: dam | 50: driving circuit area |

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A display panel, comprising:
a first substrate;
a second substrate facing the first substrate;
a dam disposed between the first substrate and the second substrate along edges of the first and second substrates, the first substrate, second substrate, and dam having a same outermost incision surface;
a sealing member disposed between the first and second substrates, the sealing member being between an interior of the display panel and the dam; and
a driving circuit along a first side of the first substrate, the dam extending along three sides of the first substrate other than the first side of the first substrate,
wherein the dam extends continuously only along the three different sides of the first substrate to define an approximate U-shape along respective edges of the three sides, and an outermost surface of the first substrate along the three different sides being substantially level with an outermost surface of the second substrate and the dam.

2. The display panel as claimed in claim 1, further comprising:
a pixel electrode on the first substrate; and
a common electrode on the second substrate.

3. The display panel as claimed in claim 2, wherein the common electrode includes indium tin oxide (ITO) or indium zinc oxide (IZO).

4. The display panel as claimed in claim 2, wherein an inner surface of the dam faces the interior of the display panel, the common electrode being only between the inner surface of the dam and the interior of the display panel.

5. The display panel as claimed in claim 1, wherein the dam includes a non-conductive material.

6. The display panel as claimed in claim 5, wherein the dam further comprises a column spacer configured to maintain a gap between the first and second substrates.

7. The display panel as claimed in claim 5, further comprising a color filter and an overcoat on the second substrate, the dam including a substantially same material as the overcoat.

8. The display panel as claimed in claim 1, wherein the sealing member includes a spacer.

9. The display panel as claimed in claim 8, wherein the spacer includes a non-conductive material.

10. The display panel as claimed in claim 8, wherein the spacer includes a conductive material.

11. The display panel as claimed in claim 10, wherein the spacer is electrically connected with a common electrode on the second substrate.

12. The display panel as claimed in claim 1, wherein the sealing member extends continuously along an entire perimeter of the second substrate, the dam being in direct contact with the sealing member only along three sides of the second substrate.

13. The display panel as claimed in claim 1, wherein a perimeter of the sealing member is completely enclosed between the driving circuit along the first side of the first substrate and the dam along the three other sides of the first substrate.

14. The display panel as claimed in claim 12, wherein the sealing member and the dam define a coplanar surface along the first side of the first substrate, the coplanar surface facing the driving circuit on the first substrate.

15. A liquid crystal display panel, comprising:
a first substrate;
a second substrate facing the first substrate;
a liquid crystal layer disposed between the first substrate and the second substrate;
a dam disposed between the first substrate and the second substrate along edges of the first and second substrates, the dam including an insulating material and being spaced apart from the liquid crystal layer;
a sealing member disposed between the first and second substrates, the sealing member being between the liquid crystal layer and the dam; and
at least one conductive member having an end portion positioned on the first substrate or the second substrate, a terminal edge of the end portion being coplanar with a lateral surface of the sealing member, and the terminal edge of the end portion contacting the dam to be electrically blocked from the outside.

16. The liquid crystal display panel as claimed in claim 15, wherein the dam, the first substrate, and the second substrate have a same outermost incision surface.

17. A manufacturing method of a liquid crystal display panel, comprising:

defining a plurality of cells on first and second substrates, the first and second substrates facing each other;
forming a thin film transistor in each cell on the first substrate;
forming a color filter and a common electrode in each of the plurality of cells on the second substrate;
forming a dam along boundaries of the defined cells on the second substrate;
forming a sealing member on the second substrate adjacent to the dam, each sealing member being between an interior of a respective cell and the dam;
forming a liquid crystal layer in the interior of each cell;
forming a driving circuit area along a first side in each cell of the plurality of cells on the second substrate, such that the dam is formed along three sides, other than the first side, of each cell;
sealing the first substrate and the second substrate, such that each of the dam and the sealing member is between the first and second substrates; and
cutting out each cell through the dam, such that the dam is along edges of the first and second substrates in each cell, and the first substrate, second substrate, and dam having a same outermost incision surface,
wherein the dam extends continuously only along the three different sides of the first substrate to define an approximate U-shape along respective edges of the three sides, and an outermost surface of the first substrate along the three different sides being substantially level with an outermost surface of the second substrate and the dam.

18. The manufacturing method as claimed in claim 17, wherein forming the sealing member includes depositing a sealant with a higher height than that of the dam.

19. The manufacturing method as claimed in claim 17, wherein the dam is formed of a non-conductive material.

* * * * *